United States Patent [19]
Riegler et al.

[11] 3,938,855
[45] Feb. 17, 1976

[54] LARGE CONVERTER ARRANGEMENT

[75] Inventors: Ernst Riegler, Enns; Manfred Schmidt, Linz, both of Austria

[73] Assignee: Vereinigte Osterreichische Eisen- und Stahlwerke-Alpine Montan Aktiengesellschaft, Linz, Austria

[22] Filed: Jan. 7, 1975

[21] Appl. No.: 539,175

[52] U.S. Cl. .............. 308/6 R; 308/176; 308/237 R
[51] Int. Cl.² ......................................... F16C 29/00
[58] Field of Search .......... 308/72, 6 R, 176, 237 R, 308/237 A; 266/36 P

[56] References Cited
UNITED STATES PATENTS

| | | | |
|---|---|---|---|
| 3,291,542 | 12/1966 | North | 308/176 X |
| 3,311,427 | 3/1967 | Toth et al. | 308/6 R |
| 3,350,144 | 10/1967 | Beckman et al. | 308/176 X |

*Primary Examiner*—M. Henson Wood, Jr.
*Assistant Examiner*—Gene A. Church
*Attorney, Agent, or Firm*—Brumbaugh, Graves, Donohue & Raymond

[57] ABSTRACT

A large converter construction that is trunnion-supported in a driven expansion bearing and a driven fixed bearing with a trunnion-receiving bushing and a trunnion-connected driving toothed wheel on either side, has torque-transmitting crowned rollers inserted between the bushing and the trunnion, at least on the expansion side. A force-locking connection between the trunnion and bushing is provided on the fixed bearing side. The fixed bearing assembly also comprising a bearing containing inner rings and outer rings with spherical running faces having a common center.

11 Claims, 6 Drawing Figures

LARGE CONVERTER ARRANGEMENT

BACKGROUND OF THE INVENTION

The invention relates to a large converter arrangement which is driven on the expansion bearing side and on the fixed bearing side.

In the field of general engineering it is customary to mount a shaft in a fixed bearing on one side and in an expansion bearing on the other side in order to accommodate thermal expansions and assembly deficiencies, and in order to guarantee smooth operation. Also in a converter plant for the production of steel it is customary to mount the converter carrying ring in a fixed bearing by means of one carrying trunnion and in an expansion bearing by means of the other carrying trunnion.

In large converters it is necessary, because of the great torques to be transmitted, to provide a tilting drive on the fixed bearing side as well as on the expansion bearing side. Special problems arise in the torque support of the drive on the expansion bearing side due to axial movements which can be on the order of ± 80 mm. The drive on the the expansion bearing side must be able to follow this axial movement and the torque support must remain fully operable. Further difficulties in large converters also arise because the displacement which is accommodated by pendulum roller bearings, e.g., gives rise to a pronounced eccentric movement of the converter during tilting, since the points of displacement are relatively far away from the places where the displacement actually occurs. Finally, there are welding problems during the binding-in of the carrying trunnion into the carrying ring. When quenched and subsequently tempered steel, that meets the requirements to the fullest extent, is to be used for the carrying trunnion it is difficult to heat up the trunnion during welding. Therefore, steels with a hot yield point of up to 25 kp/mm$^2$ were generally used and it was necessary to put up with overdimensioned trunnions.

SUMMARY OF THE INVENTION

It is the object of the invention to eliminate these difficulties and to create a construction on the expansion bearing side as well as on the fixed bearing side, which requires little space, enables the use of quenched and subsequently tempered materials, and optimally meets the requirements of displacement on the expansion bearing and fixed bearing sides as well as axial movability on the expansion bearing side.

The invention solving this problem comprises providing the expansion bearing with a bushing inserted into the converter wall or into the converter carrying ring. This bushing has recesses of semi-circular cross-section and receives an axially movable trunnion with corresponding recesses of semi-circular cross-section. The trunnion is connected with the driving toothed wheel of the expansion bearing or forms a part of the same. Crowned rollers are inserted into the complementing recesses of the bushing and the trunnion for transmitting the torque. The fixed bearing on the opposite side is also provided with a bushing inserted into the converter wall or into the converter carrying ring and the trunnion of the driving toothed wheel of the fixed bearing side protrudes into this bushing. The bushing and the trunnion part protruding into the bushing are force-locked to one another and a bearing comprised of inner rings and outer rings, whose mutual running faces formed as spherical faces have a common center, is provided between the bushing and the trunnion.

For transmitting the torque, according to one embodiment of the invention, the trunnion protruding into the bushing on the fixed bearing side is provided with a spherical-zone-shaped hub with an arcuate external toothing following the spherical zone, which meshes with a straight internal toothing of the bushing.

According to another embodiment for the fixed bearing side — similar to the construction on the expansion bearing side — the trunnion protruding into the bushing can have recesses of semi-circular cross-section around its periphery and corresponding recesses of semi-circular cross-section may be provided on the inner side of the bushing. Crowned rollers are inserted into the complementing recesses of the trunnion and the bushing for transmitting the torque.

The invention makes it possible to produce the trunnions on the fixed bearing and on the expansion bearing sides of quenched and subsequently tempered steel, since there are no welding problems.

According to the invention the drives on the fixed bearing side and on the expansion bearing side are made in the same way, the driving toothed wheels being enclosed in a housing secured to the base.

On the fixed bearing side and on the expansion bearing side one pinion, or preferably more than one, together with intermediate gearing and motors can be flanged to the housings.

BRIEF DESCRIPTION OF THE DRAWINGS

In order that the invention may be more fully understood, an embodiment thereof will now be described by way of example with reference to the accompanying drawings in which.

DESCRIPTION OF PREFERRED EMBODIMENTS

Figure 3:
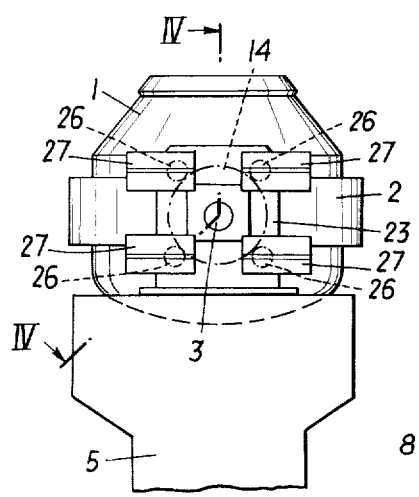
FIGS. 2 and 3 are the corresponding plan and side views, respectively.
Figure 1:
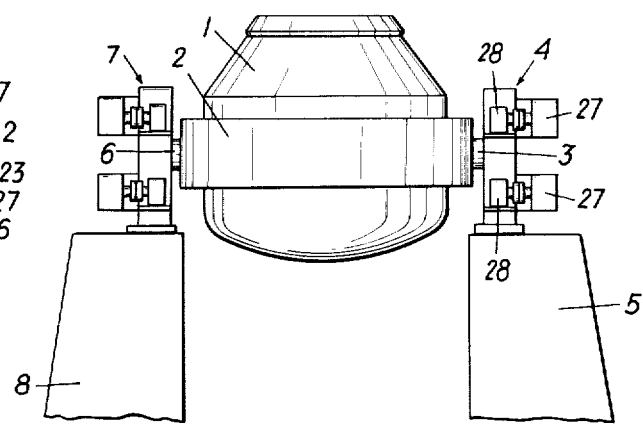
FIG. 1 is a general view of a converter plant.

In the drawings the converter is denoted with 1, the carrying ring with 2, the trunnion on the fixed bearing side with 3, the drive on the fixed bearing side with 4, and the base on the fixed bearing side with 5. On the opposite side the trunnion on the expansion bearing side is denoted with 6, the drive on the expansion bearing side with 7, and the base on the expansion bearing side with 8.

Figure 4:
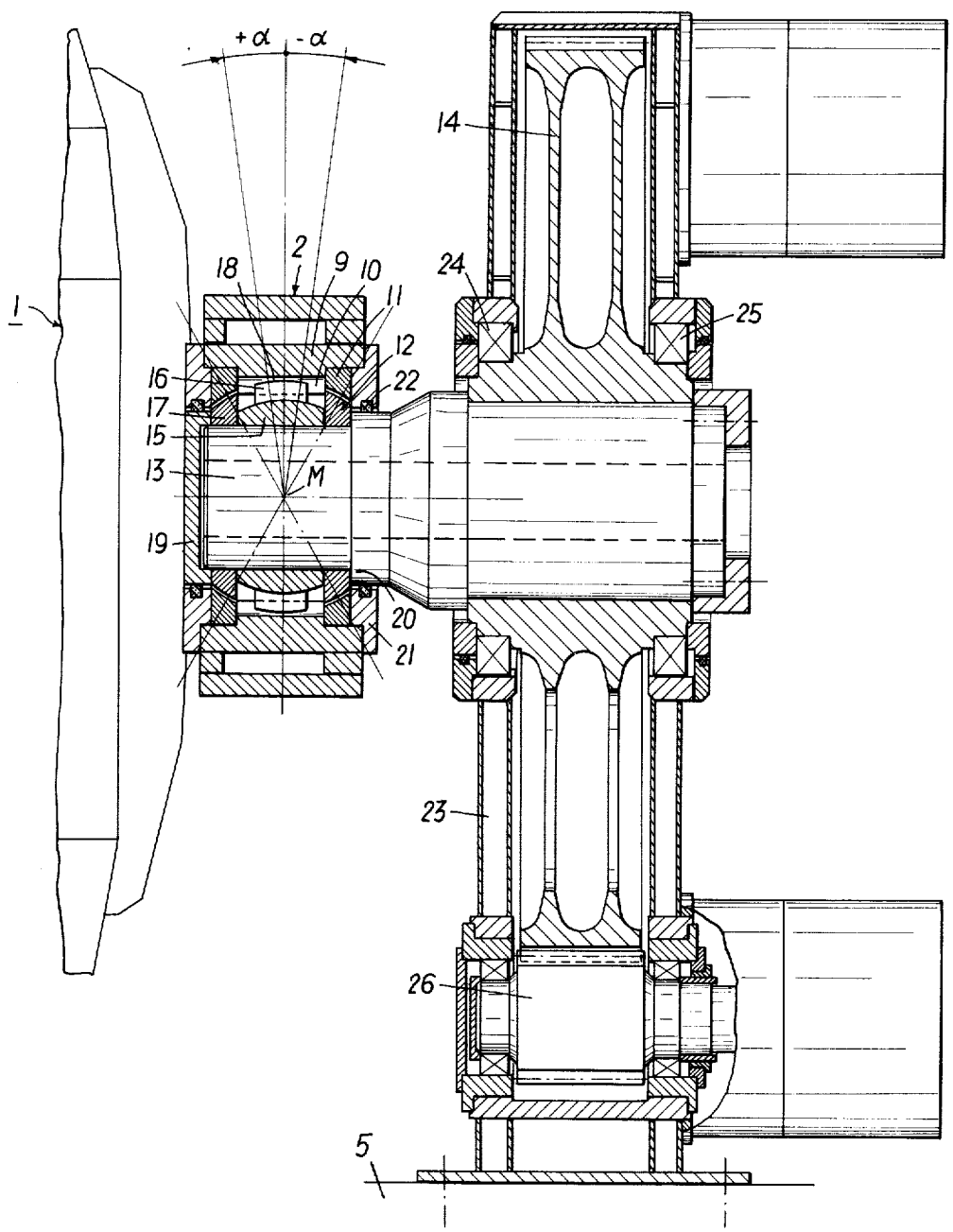
FIG. 4 shows a section through the fixed bearing along line IV—IV of FIG. 3.

As can be seen from FIG. 4, a bushing 9 is welded into the carrying ring 2 on the fixed bearing side. On the inner side of bushing 9 a straight toothing 10 is provided. The outer rings 11 of the bearing according to the invention, which have spherical running faces 12, are secured to the bushing. Into the bushing a trunnion 13 protrudes, which trunnion is connected to the driving toothed wheel 14 forming a one-piece unit with the driving toothed wheel. On the part of the trunnion protruding into the bushing a spherical-zone-shaped hub 15 is provided which has an arcuate toothing 16 meshing with the counter toothing 10. On both sides of the hub the inner rings 17 of the bearing of the invention are arranged on the trunnion, which inner rings also have spherical running faces 12 and enclose the toothings of the trunnion and the bushing. The spherical faces 12 of the rings 11 and 17 and the arcuate toothing 16 have a common center M lying in the trunnion axis. The bearing is dimensioned in such a way that a slight play 18 is present between the top circle of the toothing 16 and the root circle of the toothing 10, thereby freeing the toothing from load. It is understandable that in a displacement the outer rings and the inner rings of the bearing pivot against one another, thus accommodating angular displacements of ±α.

Figure 2:
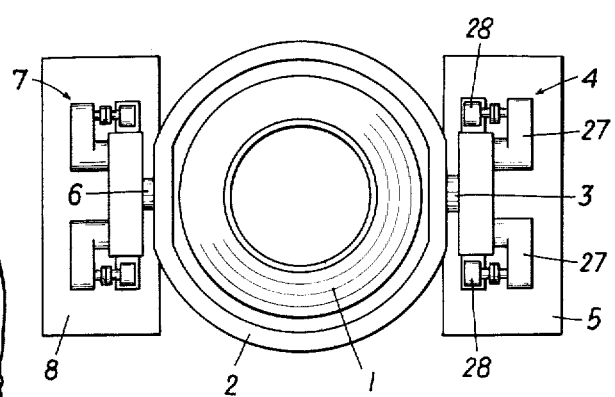

On the side of the converter an end lid 19 is provided on the bearing which lid braces the bearing toward the shoulder-like step 20 of the trunnion. On the side of the drive there is a closing ring 21 which serves with seals 22 as a seal toward the trunnion. The toothed wheel 14 is inserted in a housing 23 secured to the base 5. Due to the fact that the housing is secured to the base, a separate torque support is unnecessary. Reference numbers 24 and 25 indicate slide, articulation-, or ball and roller bearings, one of which acts as a fixed bearing and the other of which acts as an expansion bearing. Furthermore, four pinions 26 are flanged to the housing, together with intermediate gearing 27 and motors 28, as can be seen in detail in FIGS. 2 and 3. According to the invention quenched and subsequently tempered steel can be used for the trunnion 13, because it is not welded into the carrying ring and thus no problems arise due to pre-heating. Therefore, the trunnion may be constructed according to the wear and stresses expected and may be optimally dimensioned, i.e., it need not be overdimensioned.

Figure 6:
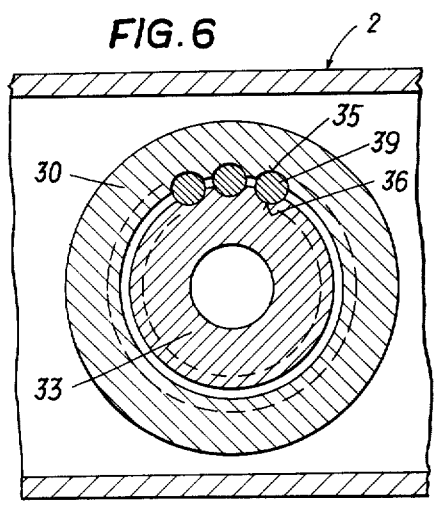
Figure 5:
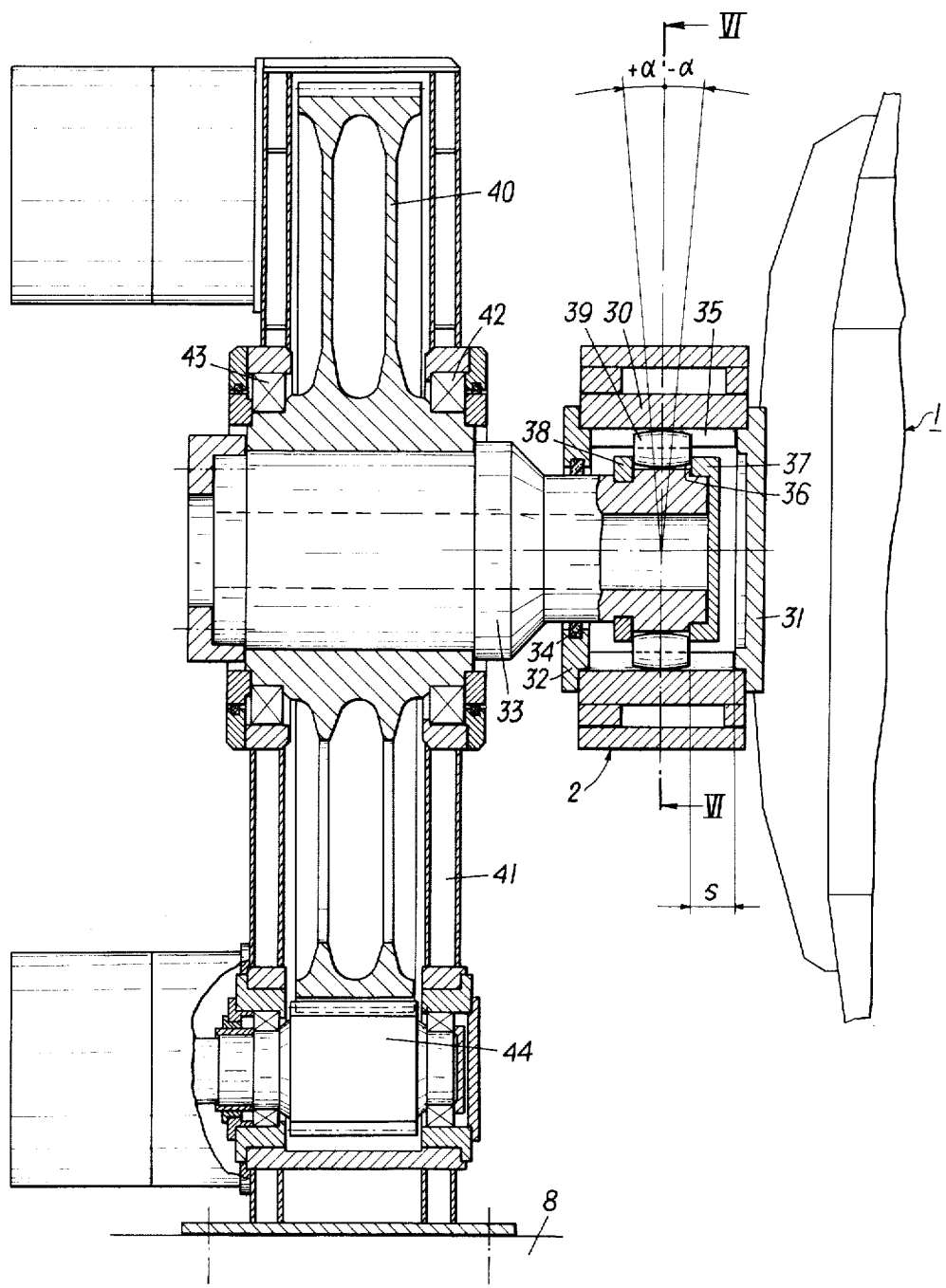
FIG. 5 shows a section through the expansion bearing, the section being analogous to FIG. 4; and in FIG. 6 a section along line VI—VI of FIG. 5 is shown.

As can be seen from FIG. 5, on the expansion bearing side a bushing 30 is welded into the carrying ring 2, which bushing is closed with a lid 31 on the converter side. On the drive side a lid 32 is provided which is passed through by the trunnion 33. Reference number 34 indicates seals. On the inner side of the bushing 30, semi-circular recesses 35 are provided, which extend over the whole depth of the bushing. The part of the trunnion protruding into the bushing is provided with corresponding semi-circular recesses 36, so that the recesses lying opposite one another complement one another forming a circular profile, as can be seen in FIG. 6. The trunnion recesses are limited on the converter side by a distance disc 37 and on the drive side by a divided position ring 38. Into the recesses 35 and 36 crowned rollers 39 are inserted for transmitting the torque. The trunnion 33 is connected to the driving toothed wheel 40 forming a one-piece unit therewith that is comprised of quenched and subsequently tempered steel, especially cast steel. The toothed wheel is enclosed in the housing 41 and is mounted in the bearings 42 and 43, one of which acts as a fixed bearing and the other of which acts as an expansion bearing. The housing 41 is secured to the base 8, thus making an additional torque support superfluous. The bearings 42 and 43 may be slide, articulation, or ball and roller bearings. Into the external toothing of the toothed wheel 40 pinions 44 engage. These pinions may have herring-bone toothing or straight toothing. Suitably, four pinions together with their intermediate gears and motors are flanged to the housing. The construction according to the invention enables the accommodation of angular displacements of ±α up to a few degrees, as is suggested in FIG. 5. Also, an axial movement is possible to a considerable extent by the sliding of the rollers 39 in the recesses 35 of the bushing. This possibility of axial movement is denoted with "S" in FIG. 5. The construction according to the invention is simple, has little weight and is much less complex than, e.g., a pendulum roller bearing with cast housing, because a considerably longer path is available for the axial movement due to the width of the carrying ring. Furthermore, it is possible according to the invention to accommodate the axial movement and the angular displacement in the places where they occur. The points of displacement are near the center of the carrying ring profile; therefore, these displacements have no or only very little influence upon the eccentric movement of the converter during tilting. Although one embodiment of the invention has been described in the drawing on a converter with a carrying ring, those skilled in the art will know that the invention can also be realized in a converter without a carrying ring, in which case bushings for transmitting the torque are inserted into the converter wall itself on the fixed bearing side as well as on the expansion bearing side.

What we claim is:

1. A drive and bearing arrangement for a large converter construction with an expansion bearing assembly on one side, a fixed bearing assembly opposite the expansion bearing assembly and driving means for both the expansion bearing assembly and the fixed bearing assembly, characterized in that the expansion bearing assembly comprises a first bushing with recesses of semi-circular cross-section therein, an axially movable first trunnion supported in said first bushing and having recesses of semi-circular cross-section therein, the recesses in said first bushing and the recesses in said first trunnion complementing one another so as to form spaces of circular profile, a first driving toothed wheel in connection with said axially movable first trunnion, and torque-transmitting crowned rollers located within said spaces of circular profile; and further characterized in that the fixed bearing assembly comprises a second bushing, a second trunnion, part of which protrudes into and is force-locked to said second bushing, a second driving toothed wheel in connection with said second trunnion, and a bearing, containing inner rings and outer rings, provided between the bushing and the trunnion, said rings having spherical faces acting as mutual running faces, which running faces have a common center.

2. A drive and bearing arrangement as set forth in claim 1, wherein the converter construction comprises a converter carrying ring and wherein said first bushing and said second bushing are inserted in said converter carrying ring.

3. A drive and bearing arrangement as set forth in claim 1, wherein said first bushing and said second bushing are inserted in the converter wall.

4. A drive and bearing arrangement as set forth in claim 1, wherein said axially movable first trunnion forms part of said first driving toothed wheel.

5. A drive and bearing arrangement as set forth in claim 1, wherein said second trunnion forms part of said second driving toothed wheel.

6. A drive and bearing arrangement as set forth in claim 1, further comprising in the fixed bearing assembly, a hub with a spherical face provided on the part of said second trunnion protruding into said second bushing, said hub having an arcuate external toothing following the spherical face and said second bushing having a straight internal toothing meshing with said arcuate external toothing of the hub.

7. A drive and bearing arrangement as set forth in claim 1, wherein in the fixed bearing assembly the part of the second trunnion protruding into the second bushing has peripheral recesses of semi-circular cross-section and the second bushing has internal recesses of semi-circular cross-section, the recesses in the second bushing and the recesses in the second trunnion complementing one another, so as to form spaces of circular profile, torque-transmitting crowned rollers being located in said spaces of circular profile of the fixed bearing assembly.

8. A drive and bearing arrangement as set forth in claim 1, wherein said first trunnion and said second trunnion are comprised of quenched and subsequently tempered steel.

9. A drive and bearing arrangement as set forth in claim 1, wherein the driving means for the expansion bearing assembly and the driving means for the fixed bearing assembly are of identical design, said first driving toothed wheel and said second driving toothed wheel being enclosed in base-secured housings.

10. A drive and bearing arrangement as set forth in claim 9, wherein the expansion bearing assembly and the fixed bearing assembly each comprises at least one pinion with gearing and motors flanged to the base-secured housings.

11. A drive and bearing arrangement as set forth in claim 6, wherein the external toothing has a top circle arranged with a slight play relative to the internal toothing root circle.

* * * * *

UNITED STATES PATENT AND TRADEMARK OFFICE
CERTIFICATE OF CORRECTION

PATENT NO. : 3,938,855
DATED : Feb. 17, 1976
INVENTOR(S) : Riegler et al.

It is certified that error appears in the above-identified patent and that said Letters Patent are hereby corrected as shown below:

First page, following Item [21], insert:

--[30]   Foreign Application Priority Data
         Jan. 10, 1974     Austria ........... 170/74--;

First page, 2nd col., 8th line of the Abstract, after "and" insert --the--; lines 9 and 10 of the Abstract, "comprising" should read --comprises--; and Col. 3, line 19, "articulation-" should read -- articulation --.

Signed and Sealed this fourth Day of May 1976

[SEAL]

Attest:

RUTH C. MASON
*Attesting Officer*

C. MARSHALL DANN
*Commissioner of Patents and Trademarks*